United States Patent [19]

Jörnhagen

[11] Patent Number: 5,417,442
[45] Date of Patent: May 23, 1995

[54] SEALING DEVICE

[75] Inventor: Lennart Jörnhagen, Frenchs Forest, Australia

[73] Assignee: Forsheda AB, Forsheda, Sweden

[21] Appl. No.: 955,827

[22] Filed: Oct. 2, 1992

[30] Foreign Application Priority Data

Nov. 21, 1991 [AU] Australia .................. 88033/91

[51] Int. Cl.6 .................................... F16J 9/00
[52] U.S. Cl. ................... 277/207 A; 277/34; 277/DIG. 2; 285/399
[58] Field of Search ........... 277/207 A, 34, DIG. 2, 277/34.3, 58, 207 R; 285/374, 399, 346

[56] References Cited

U.S. PATENT DOCUMENTS

| 393,684 | 11/1888 | Berryhill | 277/34 |
| 2,309,658 | 2/1943 | Miller | 277/34 |
| 2,615,741 | 10/1952 | Nathan | 277/207 A |
| 2,809,853 | 10/1957 | Nathan | 277/207 A |
| 2,832,614 | 4/1958 | Settle, Jr. | 277/207 A |

FOREIGN PATENT DOCUMENTS

| 01743005 | 9/1966 | Canada | 277/34.3 |
| 0851299 | 1/1940 | France | 277/207 A |

Primary Examiner—Daniel G. DePumpo
Attorney, Agent, or Firm—Baker & Daniels

[57] ABSTRACT

A sealing device for sealing two concrete pipe end portions in relation to each other comprises a sealing surface (4) in a socket (2) of one of the pipe end portions and a sealing surface (14) on a spigot end (12) of the other pipe end portion. The spigot end is introduced into the socket and there is between the sealing surfaces formed a sealing space in which an elastic material sealing element (26) is positioned in a compressed state. A closure device (28) is positioned in the sealing space between the interior of the pipe end portions and the sealing element (26) for preventing a medium conveyed in the pipe end portions from contacting the sealing element as well as the sealing surfaces at least in a region of the sealing element.

9 Claims, 8 Drawing Sheets

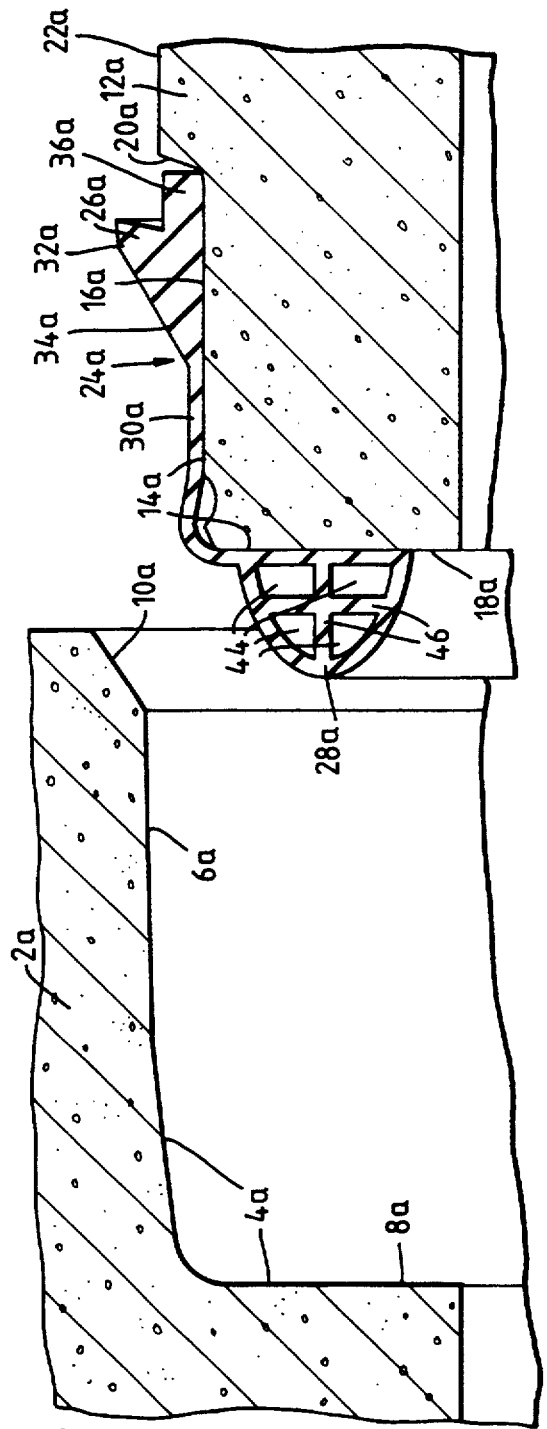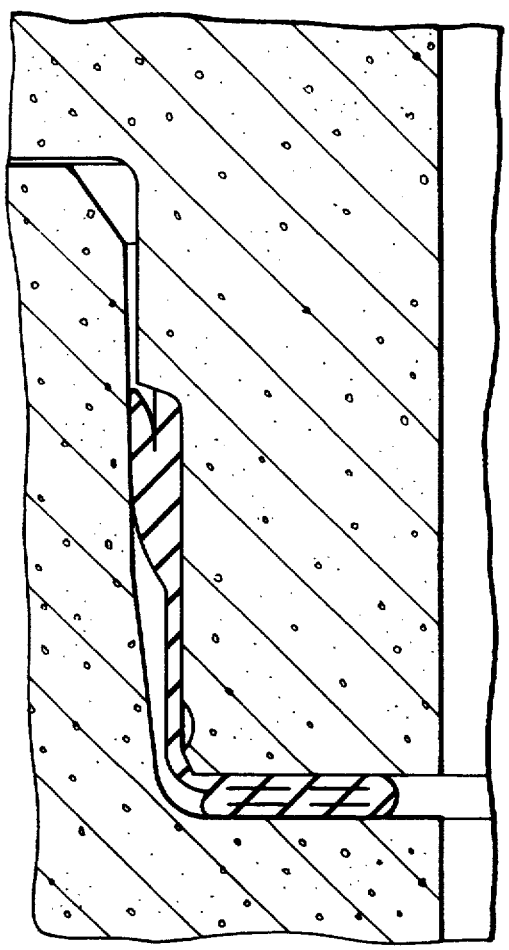
Fig.2a.
Fig.2b.

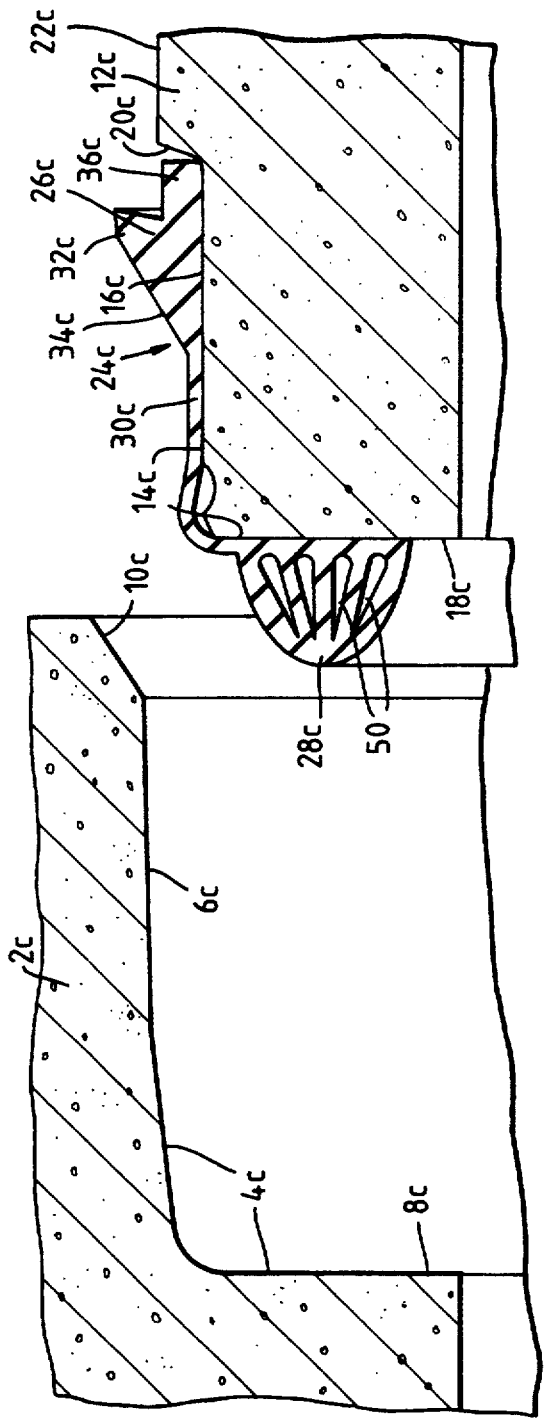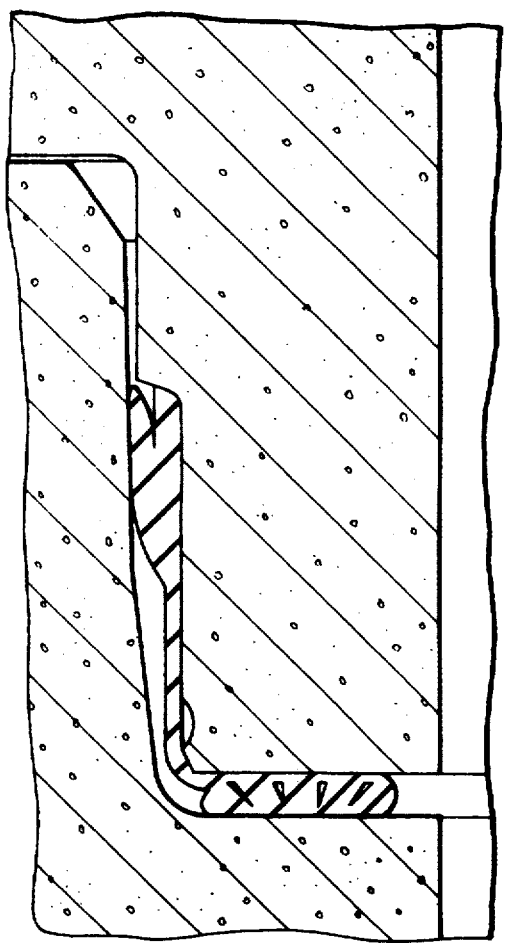

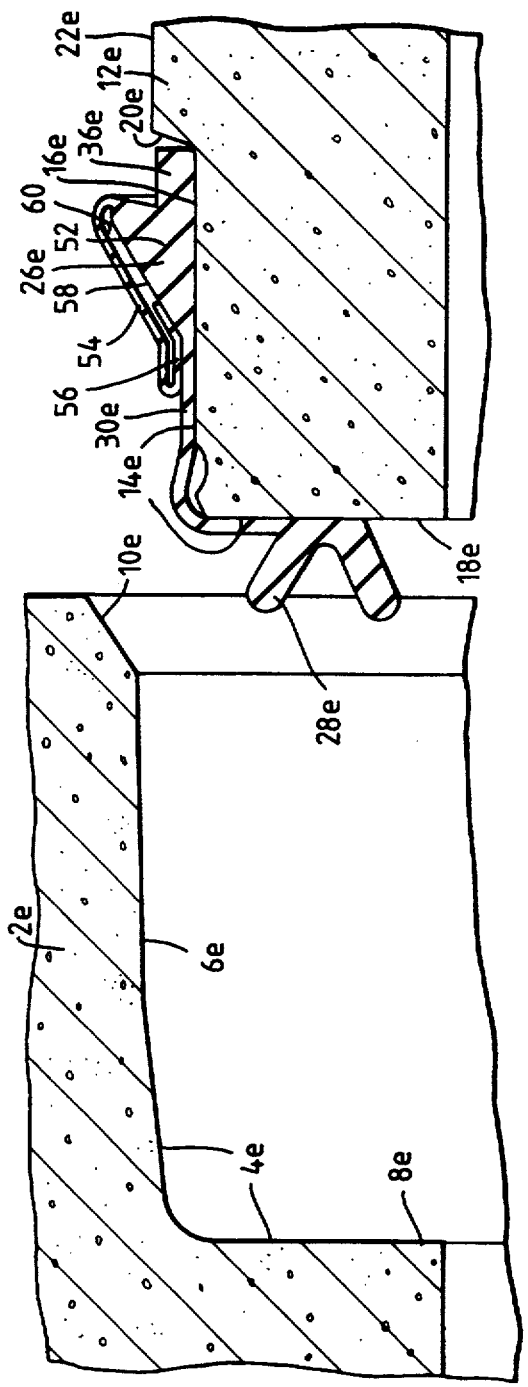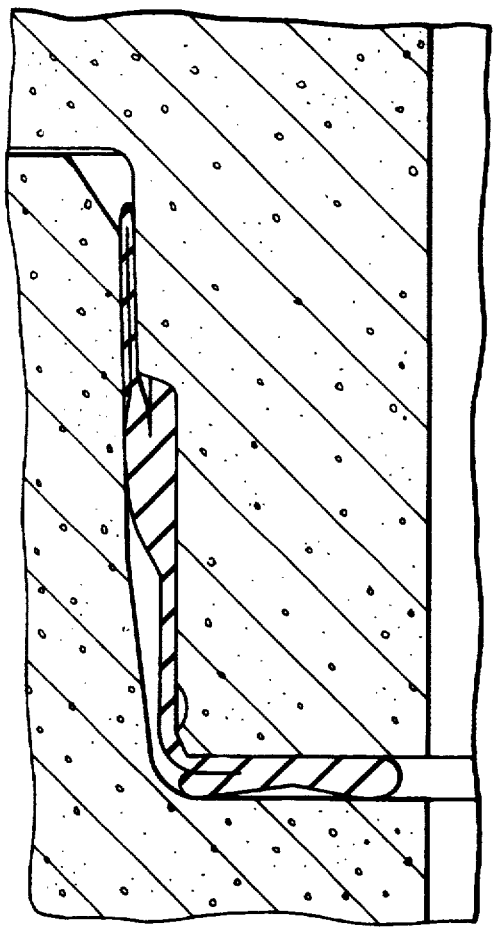

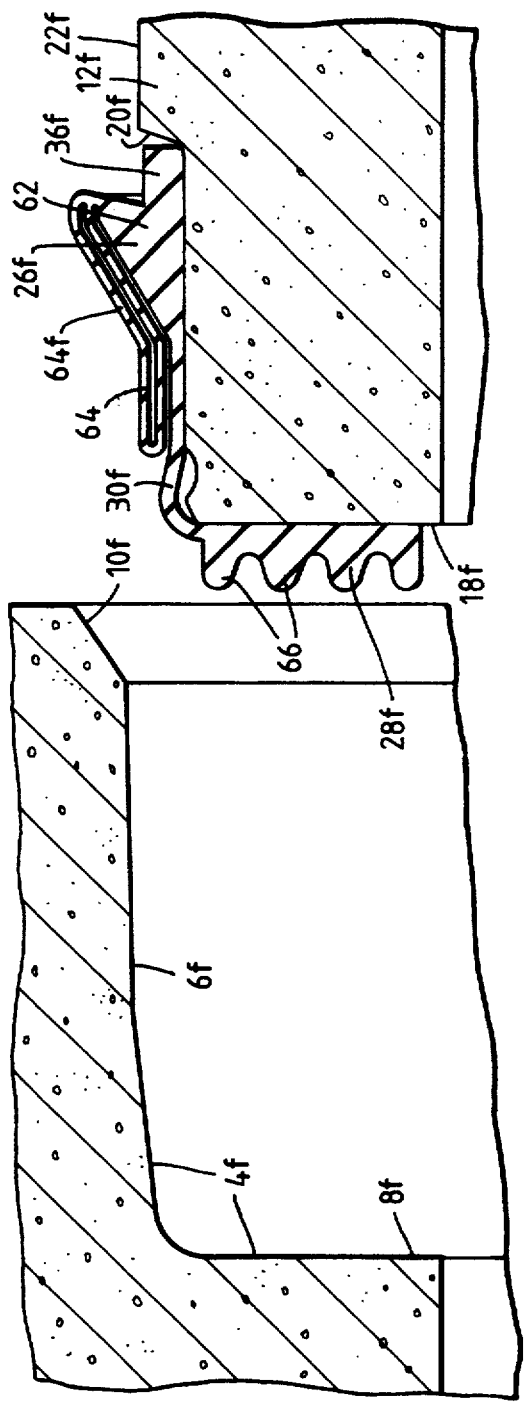
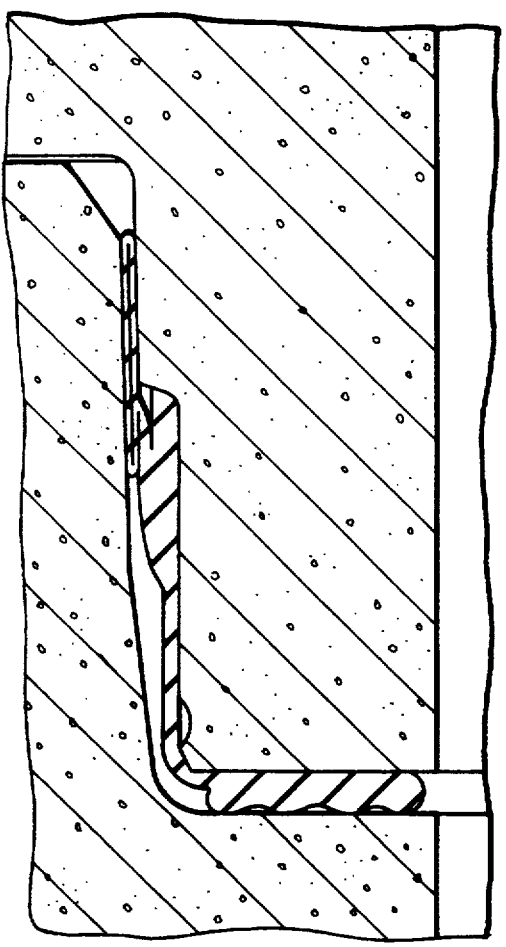
Fig.7a.
Fig.7b.

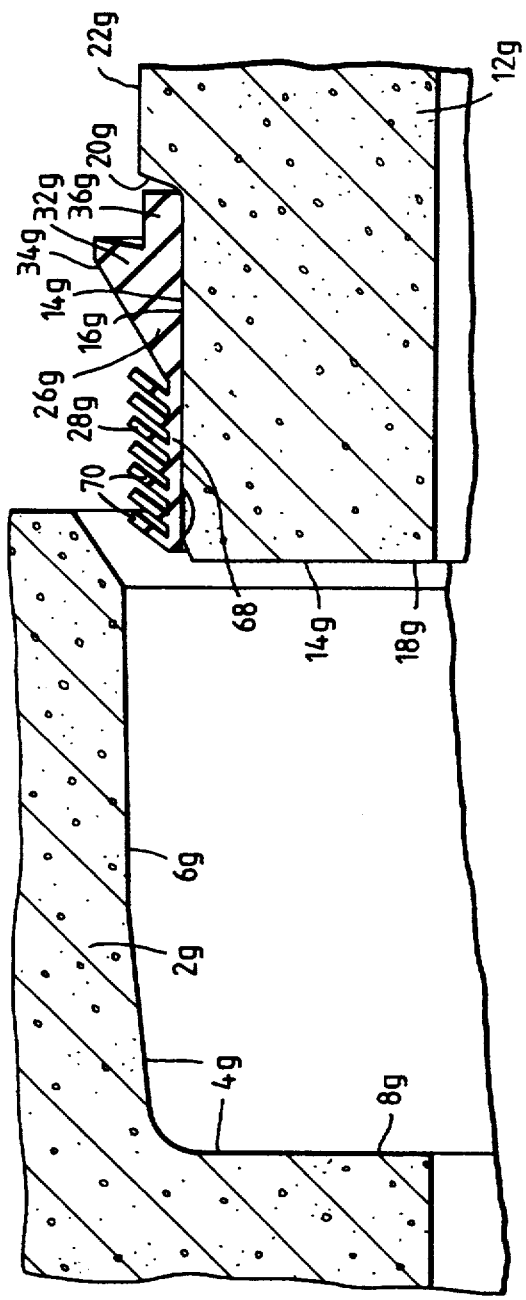
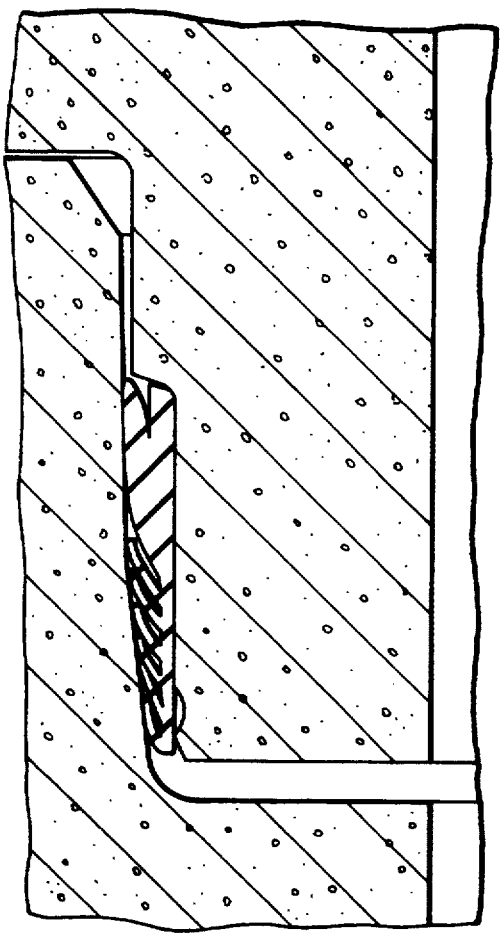

SEALING DEVICE

BACKGROUND OF THE INVENTION

The present invention relates to a sealing device for sealing two concrete pipe end portion in relation to each other.

For providing a tight connection between concrete pipes there are often used socket pipes forming at one end a socket and at the other end a spigot, two pipes being jointed by introducing the spigot of one of the pipes into the socket of the other pipe. Thereby, a sealing surface in the socket of one of the pipe end portions and a sealing surface on the spigot end of the other pipe end portion introduced into the socket together form a sealing space which is connected with the interior of the pipe end portions. In the sealing space there is positioned an elastic material sealing element which is compressed between two opposite sealing surface portions of the sealing space.

Concrete pipes of this kind are used for example for conveying waste water. It happens that the waste water contains aggressive substances, for example marsh gas or sulphurous gas effecting and degrading the concrete material of the pipes. It is possible to extend the life of the pipes by increasing the thickness of the pipe walls but a degradation of the concrete material in the areas of the sealing devices between the pipes inevitably leads to defective tightness of the pipe joints. This depends on the fact that the degradation of the sealing surfaces provides an increased width of the sealing space so that the compression of the sealing element necessary for the function thereof is successively decreased and lost.

The object of the invention is to provide a sealing device for concrete pipes making it possible to convey by means of the pipes mediums containing substances which are detrimental to the concrete without causing the risk of jeopardizing the function of the sealing device.

SUMMARY OF THE INVENTION

In order to comply with this object the sealing device according to the invention is characterized by a closure device positioned in the sealing space between the interior of the pipe end portions and the sealing element for preventing the medium conveyed in the pipes from contacting the sealing element and the sealing surface portions positioned in the region of the sealing element.

Preferably the closure device positioned in the sealing space is constituted by a rubber elastic material element which for example consists of an annular hose filled with gas, preferably air. Thereby it is suitable that the gas-filled annular hose is compressed in a section of the sealing space, which is defined by an end surface of the spigot and an opposite surface of the socket and extends radially from the interior of the pipe end portions to a cylindrical section of the sealing space. This means that the medium conveyed in the piping is completely prevented from entering the sealing space which in turn provides that the sealing device is maintained intact. Due to the fact that the closure element consists of a gas-filled annular hose the closure device is capable of maintaining its function also after a substantial degradation of the concrete surfaces engaged by the hose. The fact that the hose is filled with gas provides for a successive widening of the hose for maintaining its function so as to close the sealing space.

Preferably the closure element is connected with the sealing element by means of a thin wall of the same material as the sealing element and the closure element. Thus, in this embodiment the sealing element and the closure element constitute one single unit which is tensioned on the sealing surface of the spigot end before the pipe joint is established by introducing the spigot end into the socket.

The sealing element of the sealing device according to the invention can be designed in different ways. In an embodiment of the sealing device according to the invention the sealing element comprises two sealing portions which are adapted at the axial displacement of the sealing surfaces taking place when the spigot end is introduced into the socket substantially indisplaceably to engage one of the sealing surfaces each and to slide against each other along two sliding surfaces contacting each other and preferably provided with a lubricant. Thereby one of the sealing portions can constitute the main body of the sealing element while the other sealing portion is constituted by a thin, so called sliding skin. It is also possible to design the other sealing portion as a closed hose which at the displacement of the sealing surfaces in relation to each other rolls up onto the main body of the sealing element as a caterpillar track.

BRIEF DESCRIPTION OF THE DRAWING

The invention is described in the following with reference to the accompanying drawings.

FIG. 1b is an axial section of the completed sealing device shown in FIG. 1'a.

FIGS. 2a–8a and 2b–8b are axial sections corresponding to the sections of FIG. 1a and 1b, respectively, showing other embodiments of sealing devices according to the invention.

DESCRIPTION OF THE PREFERRED EMBODIMENTS

Figure 1A:
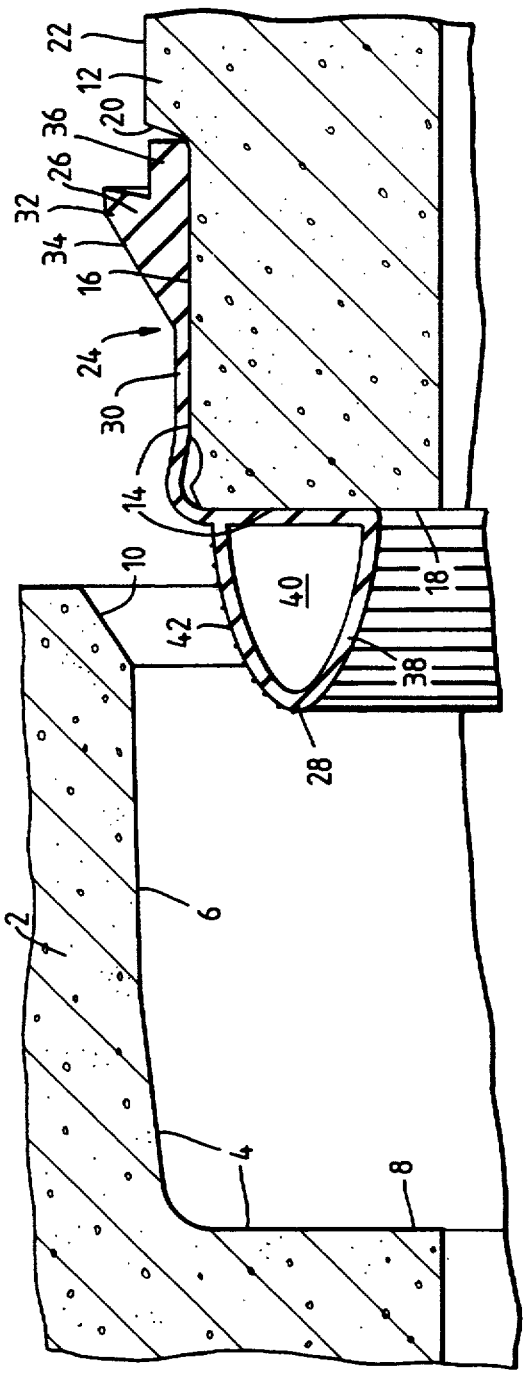
FIG. 1a is an axial section of an embodiment of a sealing device according to the invention before the pipes have been jointed.

The sealing device according to the invention is intended for sealing two concrete pipe end portions in relation to each other. The pipe end portions are part of a piping for conveying waste water containing sulphurous gas or marsh gas. The sulphurous gas is detrimental to the concrete material and successively degrades the material. In order to increase the life of the piping the concrete walls of the pipes are manufactured with larger thickness. The sealing device according to the invention is intended for solving the problems appearing at the pipe joints by the fact that the concrete is degraded in the region in which the sealing device engages the concrete.

One of the pipe end portions forms a socket 2 having at its inner surface a sealing surface 4 comprising a cylindrical portion 6 and an adjacent, annular portion 8 extending transversely of the axis of the pipe. The cylindrical portion 6 of the sealing surface 4 is somewhat conical with the smallest diameter at the inner portion which is positioned adjacent the annular portion 8 of the sealing surface. The cylindrical portion 6 of the sealing surface 4 is provided with a chamfer 10 at its outer, free end.

The other pipe end portion forms a spigot end 12 having a sealing surface 14. The sealing surface 14 comprises a cylindrical portion 16 and an annular portion 18 extending transversely to the axis of the pipe and forming the free end surface of the spigot end 12. The cylindrical portion 16 of the sealing surface 14 merges through a shoulder 20 into a cylindrical portion 22 having larger diameter than the portion 16.

A sealing and closure unit 24 consisting of rubber elastic material is positioned on the spigot end 12. The sealing and closure unit 24 consists of a sealing element 26, a closure element 28 and a connection portion 30 extending between the sealing element 26 and the closure element 28.

The sealing element 26 has a radially projecting compression portion 32 having a conical outer surface 34 and further has a support portion 36, supporting against the shoulder 20 of the spigot end 12. The closure element 28 is constituted by an annular, tightly closed hose the walls 38 of which enclose an air-filled space 40. The outer surface of the wall 38 of the closure element is provided with annular beads 42.

The connection portion 30 between the sealing element 26 and the closure element 28 is constituted by a wall having substantially the same thickness as the wall 38 of the closure element 28.

The sealing and closure unit 24 is tensioned on the sealing surface 14 of the spigot end 12 with the sealing element 26 and the connection portion 30 contacting the cylindrical portion 16 of the sealing surface 14, with the support portion 36 of the sealing element 26 engaging the shoulder 20 and with the closure element 28 engaging the annular portion 18 of the sealing surface 14.

Figure 1B:
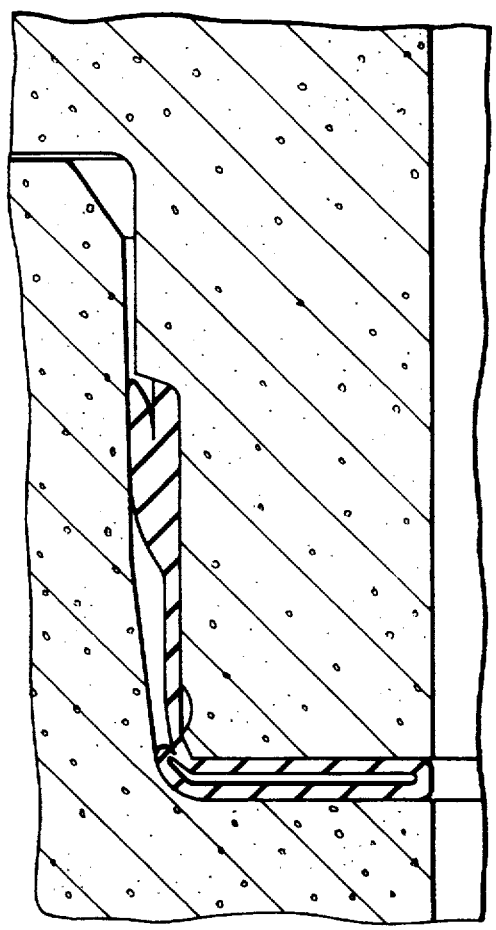

In order to establish the pipe joint according to FIG. 1b the spigot end with the sealing and closure unit is connected with the socket by introducing the spigot end into the socket in the axial direction of the pipes. Thereby the compression portion 32 of the sealing element 26 is contacted by the chamfer 10 at the end surface of the socket, the sealing element being successively compressed with the compression portion turned down towards the support portion 36. At the continued introduction of the spigot end into the socket the closure element 28 is compressed between the portion 18 of the sealing surface 14 and the portion 8 of the sealing surface 4 while the sealing element 26 is concurrently further compressed by the engagement with the conically tapering portion of the sealing surface 4.

In the final position shown in FIG. 1b the closure element 28 completely fills up the portion of the sealing space, which is defined by the portions 18 and 8 of the sealing surfaces 14 and 4 respectively, providing a complete closure of the sealing space and completely preventing the sealing space from being influenced by the medium conveyed in the piping. This means that the portion of the sealing device consisting of the sealing surfaces 14 and 6 and the sealing element 26 and positioned inside the closure element 28 is completely protected from being degraded by for example sulphurous gas which degrades the concrete material. It is realized that a degradation of the concrete material forming the sealing surfaces 6 and 14 rapidly leads to a loss of the compression of the sealing element necessary for the tightness of the joint. In a piping provided with sealing devices according to the invention only the inner surface of the piping is accessible for being attacked which means that the piping does not become untight until the complete wall of the piping has from inside being degraded by the sulphurous gas. The closure element 28 is capable of adapting to great tolerances with regard to the distance between the portions 8 and 18 of the sealing surfaces, which are engaged by the closure element 28.

Thus, the distance between the surface portions may without problems vary between 10 and 50 mm.

In FIGS. 2a and 2b, 3a and 3b, 4a and 4b, 5a and 5b, 6a and 6b, 7a and 7b and 8a and 8b there are shown embodiments of the sealing device according to the invention which are modified in relation to the embodiment according to FIGS. 1a and 1b only in relation to the design of the sealing and closure unit. Thus, also the sealing devices according to this figures comprise a spigot end and a socket of the same design as the spigot end and the socket of the embodiment according to FIGS. 1a and 1b. The socket and the spigot end as well as the sealing surfaces thereof are designated with the same reference numerals as in the embodiment according to FIGS. 1a and 1b with the addition of "a", "b", "c", "d", "e", "f" and "g".

Each of the sealing devices according to FIGS. 2a and b-5a and b comprises a sealing and closure unit 24a-24d, comprising a sealing element 26a-26d and a closure element 28a-28d. The sealing elements 26a-26d are of the same design as the sealing element 26 of the embodiment according to FIGS. 1a and 1b and comprise a compression portion 32a-32b having a conical outer surface 34a-34d and a support portion 36a-36d. The closure elements 28a-28d are connected with their sealing elements 26a-26d by means of connection portions 30a-30d extending between the sealing elements 26a-26d and the closure elements 28a-28d. The closure elements 28a-28d have substantially the same outer shape as the closure element 28 of the embodiment according to FIGS. 1a and 1b while the interiors of the closure elements 28a-28d are designed in different ways.

In the embodiment according to FIGS. 2a and 2b the closure element 28a is provided with four annular spaces 44 extending around the closure element and separated from each other by means of partitions 46 arranged as a cross.

Figure 3A:
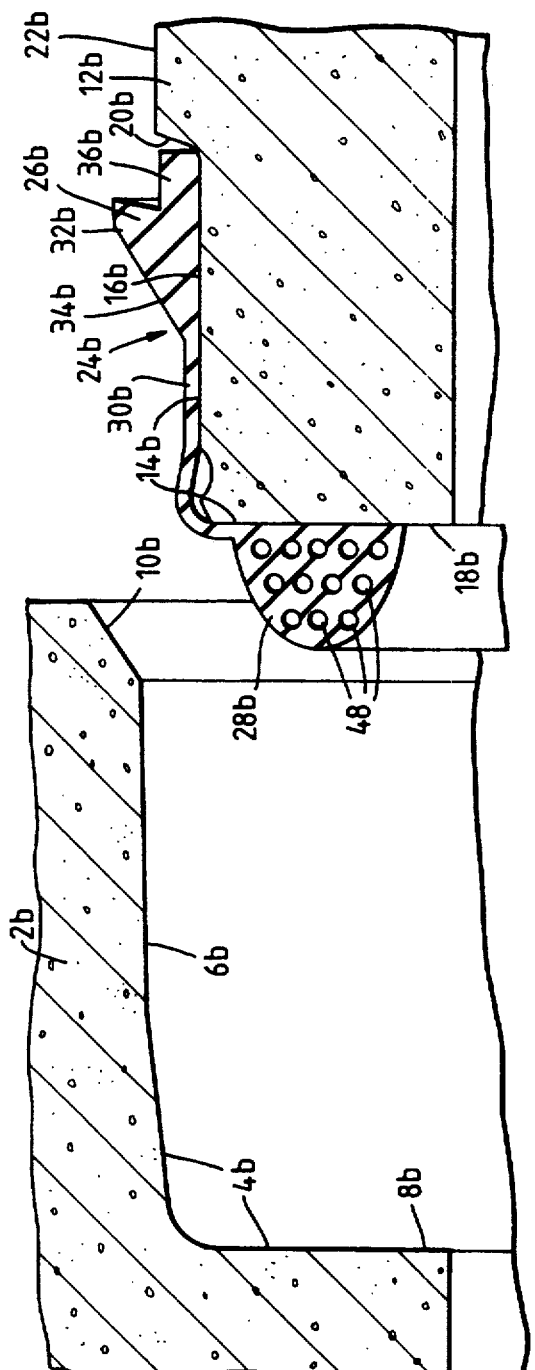
Figure 3B:
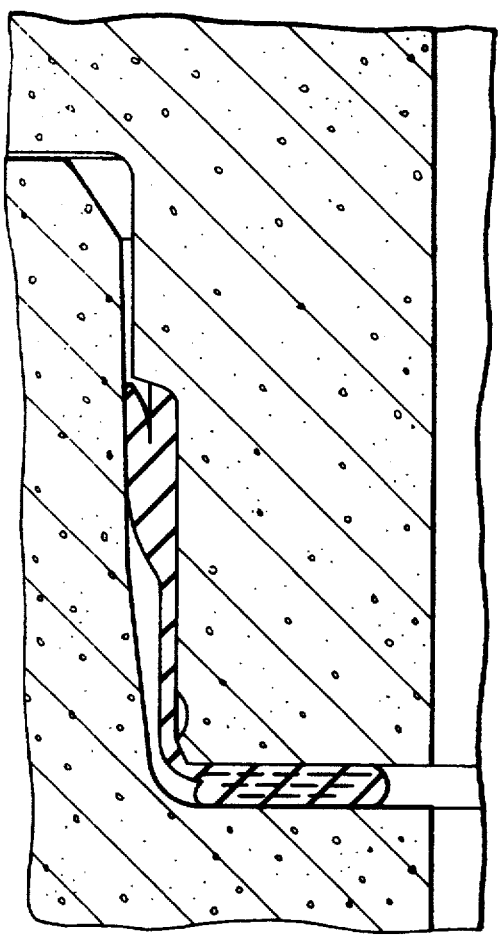

In the embodiment according to FIGS. 3a and 3b the closure element 28b is provided with a number of annular spaces 48 having a circular cross sectional shape and extending around the closure element.

In the embodiment according to FIGS. 4a and 4b the closure element 28c is provided with a number of annular spaces 50 having a longitudinal cross sectional shape and extending around the closure element. The spaces 44, 48 and 50 of the closure elements 28a, 28b and 28c in the sealing and closure units according to FIGS. 2a and 2b, 3a and 3b and 4a and 4b are closed and contain air in the same way as the space 40 in the embodiment according to FIGS. 1a and 1b. The spaces provide that the closure elements can adapt to large tolerances in respect of the distance between the surface portions of the sealing surfaces engaged by the closure element.

Figure 5A:
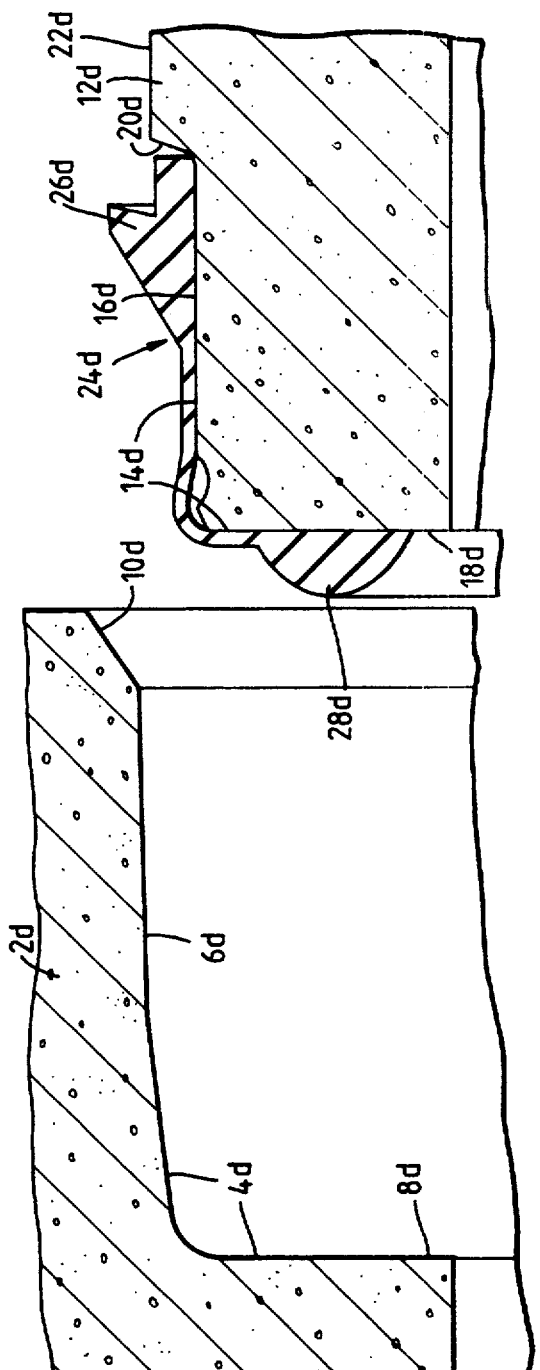
Figure 5B:
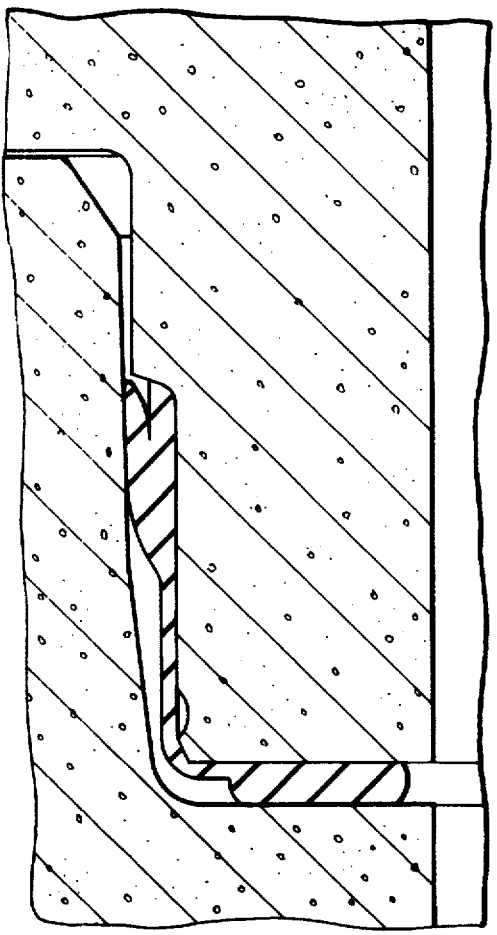

In the embodiment according to FIGS. 5a and 5b the closure element 28d has a solid cross section providing the closure element with a better capacity of taking up loads but also reducing the possibilities of the closure element to adapt to different tolerances.

The sealing device according to FIGS. 6a and 6b comprises a spigot end and a socket having sealing surface of the same design as the sealing surfaces of the embodiments shown in FIG. 1a and b -5a and b. In the sealing device according to FIGS. 6a and 6b the sealing element 26e is constructed so as to facilitate the jointing of the spigot end and the socket when establishing the sealing device. Thus, the sealing element 26e consists of a first sealing portion forming the main portion 52 of the sealing element and a second sealing portion forming a relatively thin skin 54. The skin 54 comprises a connection portion 56 formed in one unit with the skin and connected with the main portion 52 at the upper side thereof. The main portion 52 has a conical sliding surface 58 and the skin 54 extends from the connection portion 56 upwards to a folding line and therefrom downwards along the conical sliding surface 58 which is completely covered by the skin 54. At its inner surface the skin 54 forms a sliding surface 60 which is adapted to slide along the conical sliding surface 58 of the main portion when the socket and the spigot end are connected with each other. In order to facilitate the sliding movement between the sliding surfaces 58 and 60 there is a lubricant in the pocket formed by the sliding surfaces.

The connection portion 56 of the skin 54 is connected with the main portion 52 in a releasable way, i.e. in such a way that it is possible to release the skin 54 from the main portion 52 in the region of the connection portion 56 by pulling the skin 54. The releasable connection of the connection portion 56 with the main portion 52 can be provided in different ways, for example by using an adhesive having such strength that the adhesive releases the skin when the skin is subjected to a pulling force.

In the embodiment according to FIGS. 6a and 6b the closure element 28e has a V-shaped section so that the closure element 28e forms two sealing lips extending from each other.

Also in the embodiment according to FIGS. 7a and 7b the sealing element 26fis designed so as to facilitate the connection of the spigot end with the socket. Thus, the sealing element comprises a main portion 62 and a sliding skin 64 in the form of a closed hose. When the spigot end is introduced into the socket the hose rolls like a caterpillar track up onto the main portion 62 of the sealing element 26f while the inner surfaces of the sliding skin 64 slide against each other. In order to facilitate the inner sliding the hose can contain a lubricant.

In the embodiment according to FIGS. 7a and 7b the closure element 28f is formed with a solid cross section and with a number of parallel projections in order to secure the closure function.

Like the embodiments of the sealing device according to the invention described above the sealing device according to FIGS. 8a and 8b comprises a sealing and closure unit consisting of a sealing element 26g and a closure element 28g. The sealing element 26g is of the same design as the sealing element 26 in the embodiment according to FIGS. 1a and 1b and comprises a compression portion 32g having a conical outer surface 34g as well as a support portion 36g.

The closure element 28g is connected with the sealing element 26g without any intermediate connection element and consists of an annular bottom wall 68 and a number of peripheral projections 70 extending radially outwards from the bottom wall 68. The sealing and closure unit is tensioned on the cylindrical portion 16g of the spigot end sealing surface 14g.

When the pipe joint according to FIG. 8b is formed the sealing element 26gis compressed in the same way as the sealing element 26 in the sealing device of FIGS. 1a and 1b, while the closure element 28g in the embodiment according to FIGS. 8a and 8b is in the joint positioned between the cylindrical portions 6g and 16g of the sealing surfaces 4g and 14g, respectively. The closure element 28g closes the sealing space by the elastic deflection of the projections 70. Thus, the closure element 28g prevents for example sulphurous gas or any other aggressive medium from attacking the portions of the sealing surfaces between which the sealing element 26g is compressed. The closure element 28g is capable of adapting to different widths of the sealing space in which the closure element is positioned by the fact that the projections 70 may take a more or less deflected position.

The invention can be modified within the scope of the following claims.

What is claimed is:

1. In combination, a first pipe, a second pipe, and a sealing device;
    said first pipe comprising an end portion including a socket and an interior, said socket including a sealing surface,
    said second pipe comprising an end portion including a spigot end and an interior, said spigot end including a sealing surface.
    wherein said spigot end sealing surface and said socket sealing surface define a sealing space therebetween when said spigot end is introduced into said socket, said sealing space connected with said end portion interiors and comprising a radially extending sealing space section and a cylindrical sealing space section.
    said sealing device positioned in said sealing space for sealing said first pipe end portion in relation to said second pipe end portion, said sealing device comprising a sealing element of elastic material compressed in said cylindrical sealing space section, said sealing device further comprising a compressible closure element positioned in said radially extending sealing space section for preventing a medium conveyed in said pipe end portion interiors from contacting said sealing element, said closure element being compressed in the radially extending sealing space, said closure element made of a rubber elastic material and comprising at least one sealed, gas-filled, annular cavity.

2. The combination of claim 1 wherein said sealed cavity is defined by an annular hose that comprises an outer surface and a plurality of annular projections on said outer surface.

3. The combination of claim 1 wherein said closure element is connected with said sealing element by a connection portion.

4. The combination of claim 3, wherein said rubber elastic material of said closure element and said elastic material of said sealing element comprise the same material, and wherein said connection portion comprises a thin wall of said rubber elastic material.

5. The combination of claim 1 herein said radially extending sealing space extends radially between said pipe end portion interiors and said cylindrical sealing space section.

6. The combination of claim 1 wherein said second pipe end portion comprises a radially extending shoulder, wherein said sealing element comprises a radially projecting sealing portion and a support portion, and wherein said support portion engages said radially extending shoulder.

7. The combination of claim 1 herein said sealing element comprises a radially projecting sealing portion with a solid construction.

8. The combination of claim 1 wherein said closure element includes a plurality of said sealed, gas filled annular cavities.

9. The combination of claim 1 wherein said sealed cavity is defined by an annular hose.

* * * * *